(12) United States Patent
Berard et al.

(10) Patent No.: US 10,105,933 B2
(45) Date of Patent: Oct. 23, 2018

(54) LUMINOUS AUTOMOTIVE-VEHICLE GLAZING UNIT AND AUTOMOTIVE VEHICLE WITH SUCH A GLAZING UNIT

(71) Applicant: SAINT-GOBAIN GLASS FRANCE, Courbevoie (FR)

(72) Inventors: Mathieu Berard, Paris (FR); Brice Dubost, Courbevoie (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/563,232

(22) PCT Filed: Mar. 25, 2016

(86) PCT No.: PCT/FR2016/050685
§ 371 (c)(1),
(2) Date: Sep. 29, 2017

(87) PCT Pub. No.: WO2016/156720
PCT Pub. Date: Oct. 6, 2016

(65) Prior Publication Data
US 2018/0086028 A1 Mar. 29, 2018

(30) Foreign Application Priority Data
Apr. 3, 2015 (FR) ...................................... 15 52897

(51) Int. Cl.
*G02B 5/02* (2006.01)
*F21V 8/00* (2006.01)
(Continued)

(52) U.S. Cl.
CPC .... *B32B 17/10541* (2013.01); *B32B 17/1011* (2013.01); *B32B 17/10036* (2013.01);
(Continued)

(58) Field of Classification Search
CPC .......... B32B 17/10541; B32B 17/1011; B32B 17/10614; B32B 17/10036;
(Continued)

(56) References Cited

FOREIGN PATENT DOCUMENTS

| CN | 202929237 U | 5/2013 |
|---|---|---|
| WO | WO 97/08252 | 3/1997 |

(Continued)

OTHER PUBLICATIONS

International Preliminary Report on Patentability and the Written Opinion of the International Searching Authority as issued in International Patent Application No. PCT/FR2016/050685, dated Oct. 3, 2017.

(Continued)

*Primary Examiner* — Thomas M Sember
(74) *Attorney, Agent, or Firm* — Pillsbury Winthrop Shaw Pittman LLP

(57) ABSTRACT

A luminous automotive-vehicle glazing unit includes a first glazing pane, made of organic or mineral glass, of refractive index n1 of at least 1.4 with first and second main faces; a light source coupled to the first glazing pane; and a light-extracting system including a scattering layer of width of at least 1 cm including scattering dielectric particles bound by a transparent matrix of refractive index n2. The scattering particles are mainly microparticles that are spaced apart from one another and that include a shell made of a transparent dielectric material and making contact with the transparent matrix, the shell surrounding a core of refractive index n3 of at most 1.15 and of largest dimension called D3 in a range extending from 5 μm to 200 μm, the microparticles having a largest dimension D' smaller than $2D_3$.

22 Claims, 3 Drawing Sheets

(51) Int. Cl.
*B60Q 3/00* (2017.01)
*B32B 17/10* (2006.01)
*B60J 1/00* (2006.01)
*B60Q 1/30* (2006.01)
*B60Q 1/26* (2006.01)

(52) U.S. Cl.
CPC .. *B32B 17/10293* (2013.01); *B32B 17/10614* (2013.01); *B32B 17/10761* (2013.01); *G02B 5/0242* (2013.01); *G02B 6/0043* (2013.01); *G02B 6/0051* (2013.01); *B60J 1/005* (2013.01); *B60Q 1/268* (2013.01); *B60Q 1/302* (2013.01)

(58) Field of Classification Search
CPC ........ B32B 17/10293; B32B 17/10761; G02B 6/0043; G02B 6/0051; G02B 5/0242
See application file for complete search history.

(56) References Cited

FOREIGN PATENT DOCUMENTS

| | | |
|---|---|---|
| WO | WO 2004/025334 A2 | 3/2004 |
| WO | WO 2008/059170 A2 | 5/2008 |
| WO | WO 2010/049638 A1 | 5/2010 |
| WO | WO 2011/092419 A1 | 8/2011 |
| WO | WO 2012/025685 A1 | 3/2012 |
| WO | WO 2013/017790 A1 | 2/2013 |
| WO | WO 2013 109330 A2 | 7/2013 |
| WO | WO 2013/153303 A1 | 10/2013 |
| WO | WO 2013/175101 A1 | 11/2013 |
| WO | WO 2014/037643 A1 | 3/2014 |
| WO | WO 2015/079159 A1 | 6/2015 |

OTHER PUBLICATIONS

International Search Report as issued in International Patent Application No. PCT/FR2016/050685, dated Jun. 21, 2016.
Notice of Allowance as issued in U.S. Appl. No. 15/563,282, dated Jun. 29, 2018.

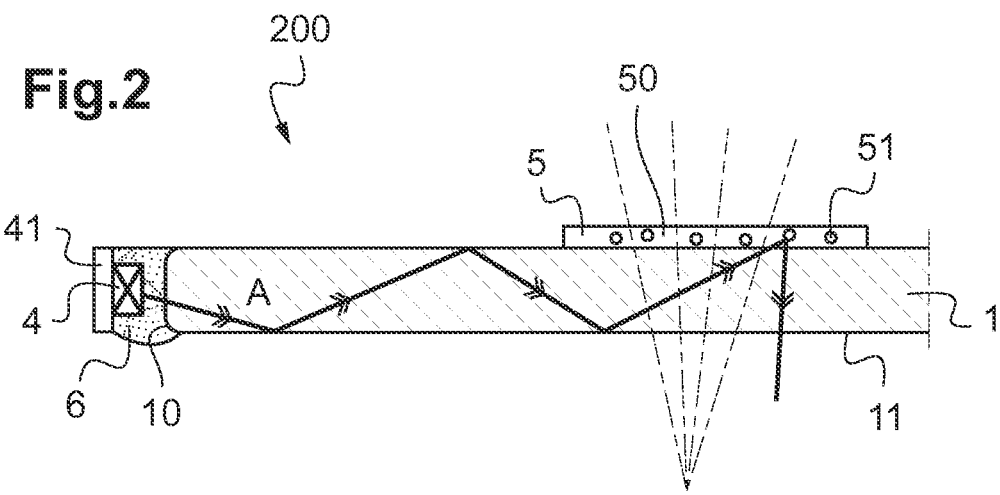
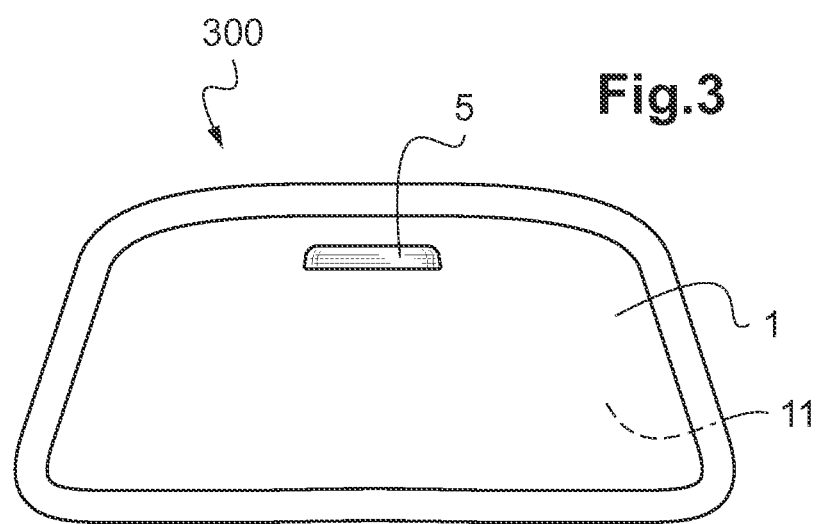

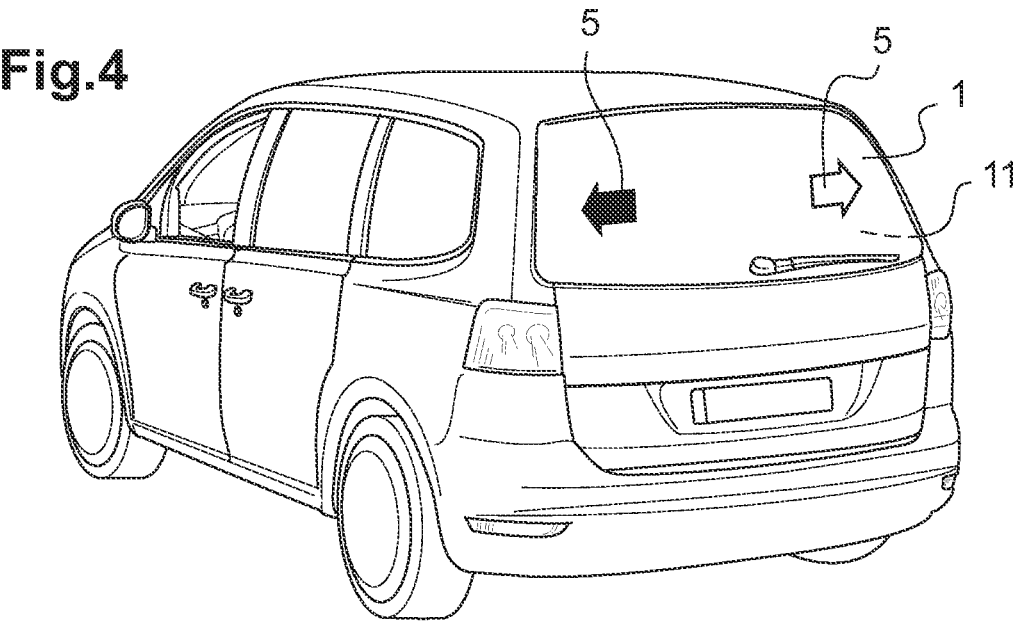
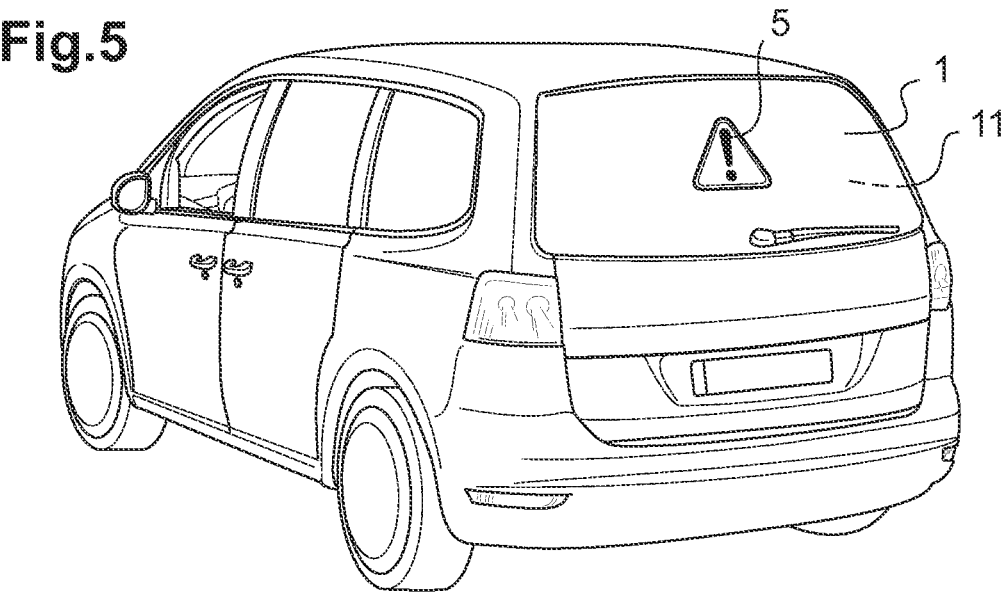

LUMINOUS AUTOMOTIVE-VEHICLE GLAZING UNIT AND AUTOMOTIVE VEHICLE WITH SUCH A GLAZING UNIT

CROSS-REFERENCE TO RELATED APPLICATIONS

This application is the U.S. National Stage of PCT/FR2016/050685, filed Mar. 25, 2016, which in turn claims priority to French patent application number 1552897 filed Apr. 3, 2015. The content of these applications are incorporated herein by reference in their entireties.

FIELD

The present invention relates to a luminous (or "illuminating") automotive-vehicle glazing unit, in particular an automotive-vehicle glazing unit employing light-emitting diodes.

BACKGROUND

Light-emitting diodes or LEDs have been used for a few years to provide light for signaling devices (traffic lights, etc.) and indicators or sidelights of automotive vehicles. The advantage of diodes is their long lifetime, their luminous efficacy, their robustness, their low power consumption and their compactness, making devices employing them more durable, and meaning they require less maintenance.

More recently, light-emitting diodes have been used for automobile roofs, in particular panoramic laminated roofs with illumination by light-emitting diodes as described in document WO2010049638. The light emitted by the diodes is introduced via an edge face into the interior glazing pane, which forms a guide, the light being extracted from the glazing pane by a scattering layer (a layer such as an enamel layer containing dielectric scattering particles) on the glazing pane, the area of which defines the luminous pattern. The scattering layer is too visible to the user in the off state (turned off). The luminous glazing unit then has a very cloudy and even most often opaque appearance in the zone of the scattering layer.

SUMMARY

The present invention therefore has therefore sought to develop a new luminous automotive-vehicle glazing unit, in particular one employing light-emitting diodes, better preserving transparency in the off state and even without too greatly decreasing the luminance of this glazing unit in the on state, while preferably remaining compatible with industrial requirements (simplicity, ease and rapidity of production, reliability, etc.).

For this purpose, one subject of the present invention is a luminous automotive-vehicle glazing unit (preferably a roof) comprising:
  a glazing module (preferably forming a laminated glazing unit) with an edge face and external main faces denoted face A and face B, said glazing module including at least one (curved) first glazing pane made of organic or mineral glass, said (transparent) first glazing pane, which has a first main face and a second main face (and a first edge face), having a refractive index $n_1$ of at least 1.4 at 550 nm (better still in all the visible spectrum) and preferably lower than 1.65 and even lower than 1.55 or indeed even lower than or equal to 1.53 at 550 nm (better still in all the visible spectrum) and preferably from 1.5 to 1.53, said first glazing pane in particular being a transparent, preferably clear and even extra-clear, and even (curved) tempered (bare or already coated) mineral glazing pane, the glazing module (and even the luminous glazing unit) in particular having (in all or some of the glazed area) a non-zero light transmission (TL) (it remains possible to see through the glazing module and the luminous glazing unit at least in the glazed area);
  a source of (visible) light, preferably on the periphery of the glazing module, preferably a set of light-emitting diodes (in one or more rows on a first printed-circuit carrier i.e. a carrier such as a PCB (printed circuit board)) in particular a strip along the first edge face of the first glazing pane, or even a light source that comprises an extracting optical fiber with a primary source of light (one or more diodes),
  the light source being optically coupled to the glazing module preferably via the edge face of the glazing module or even via face A or face B (border thereof), and even preferably (at least or even only) optically coupled to the first glazing pane preferably via the first edge face or even via the first or second main face (border thereof) in particular with a diode housing, the glazing module (preferably the first glazing pane) thus forming a guide of light emitted by the light source; and
  light-extracting means for extracting the guided light in order to form a scattering zone (luminous in the on state) of width of at least 1 cm, and even of at least 5 cm (width smaller than or equal to its length, width naturally to be distinguished from thickness, its length preferably being larger than 5 cm and even than 10 cm), said light-extracting means including (or even consisting of) a scattering layer comprising scattering dielectric particles (that are spaced apart from one another) bound by a transparent (preferably colorless) matrix of refractive index $n_2$ at least equal to $n_1$ or such that $n_1 - n_2$ is at most 0.15, even at most 0.1 or better still at most 0.05 at 550 nm (better still in all the visible spectrum) and even better still at most 0.02 at 550 nm (better still in all the visible spectrum), said scattering layer being associated with one of the first or second faces (making optical contact with one of the first or second faces), said scattering layer preferably making direct contact with one of the first or second faces and even being directly deposited on one of the first or second faces.

BRIEF DESCRIPTION OF THE DRAWINGS

The present invention will be better understood and other details and advantageous features of the invention will become apparent on reading about examples of luminous automotive glazing units according to the invention, which are illustrated by the following figures:

FIG. 1' shows a schematic cross-sectional view of a luminous automobile roof using a luminous glazing unit according to the invention;

FIG. 2 shows a schematic cross-sectional view of a luminous automotive-vehicle glazing unit in a second embodiment of the invention; and FIGS. 3 to 5 show various schematic views of various automobiles with luminous glazing units according to the invention.

DETAILED DESCRIPTION

Figure 1:
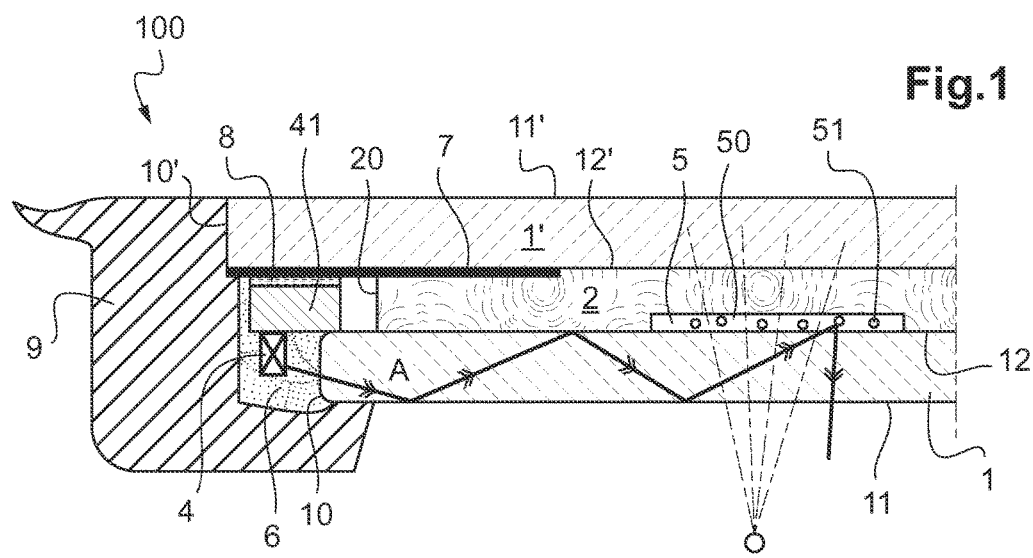
FIG. 1 shows a schematic cross-sectional view of a luminous automotive-vehicle glazing unit in a first embodiment of the invention.

In an embodiment, there is provided a luminous automotive-vehicle glazing unit comprising:
- a glazing module with an edge face and two external main faces, said glazing module including at least one first glazing pane, made of organic or mineral glass, of refractive index n1 of at least 1.4 with first and second main faces;
- a light source optically coupled to the glazing module, the glazing module forming a guide of light emitted by the light source; and
- a light-extracting system configured to extract the guided light in order to form a scattering zone of width of at least 1 cm, said light-extracting system including a scattering layer comprising scattering dielectric particles bound by a matrix, said scattering layer being associated with one of the first or second main faces;

wherein the matrix is transparent and of refractive index n2 at least equal to n1 or such that n1−n2 is at most 0.15 and wherein the scattering particles are mainly microparticles that are spaced apart from one another and that comprise a shell made of a transparent dielectric material and making contact with the transparent matrix, said shell surrounding a core of refractive index n3 of at most 1.15, said core having a largest dimension D3 in a range extending from 5 μm to 200 μm, the microparticles having a largest dimension D' smaller than $2D_3$.

Furthermore, the scattering particles are mainly (in number) microparticles that are spaced apart from one another and that comprise a shell made of a (transparent) dielectric material and making contact with the transparent matrix, said shell surrounding a core of refractive index n3 of at most 1.15 at 550 nm (better still in all the visible spectrum), better still of at most 1.05 at 550 nm (better still in all the visible spectrum), said core having a largest dimension called $D_3$ in a range extending from 5 μm to 200 μm, the microparticles having a largest dimension called D' smaller than $2D_3$.

The contrast in refractive indices between the core and the matrix (between n3 and n2) allows the guided light to be scattered more effectively than the conventional solid scattering particles by greatly limiting recourse to multiple scattering that rapidly degrades transmission properties.

Since light extraction with the microparticles according to the invention is more effective, it is thus possible to choose a low concentration, i.e. one clearly lower than a conventional scattering layer, while nonetheless obtaining a sufficiently luminous pattern. Thus, a smaller portion of the light rays passing through the glazing module is affected when the user observes the automotive-vehicle turned-off glazing unit (in the off state). The scattering layer may darken the first glazing pane or form a very light white veil depending on the illumination/ambient-lighting conditions.

With scattering layers of the prior art, one way to preserve vision through the glazing unit—to achieve an overall transparency—consisted in decreasing the density of the scattering zones, which typically took the form of a network of dots of suitable spacing and size. Thus, most of the rays passing through the faces of the glazing unit were not greatly scattered, but this was at the expense of luminance.

The scattering layer according to the invention may simply be an unapertured layer rather than such a network of subcentimeter-sized dots.

Preferably at least 80% and better still at least 90% of the total number of scattering particles and even of all the scattering and non-scattering particles of the scattering layer are microparticles according to the invention.

Unless otherwise stated in the present application, a refractive index according to the invention is indicated at 550 nm.

By convention, the first face of the first glazing pane corresponds to face A.

According to the invention, the first glazing pane is a preferably curved single (or monolithic) glazing pane, such as a sheet of (preferably clear and even extra-clear) mineral glass or a (stiff) plastic sheet. Its thickness is preferably at least 0.7 mm and even at least 1 mm.

According to the invention, an optional second glazing pane of the glazing module is a preferably curved single (or monolithic) glazing pane, such as a sheet of transparent mineral glass or a (stiff) transparent plastic sheet. Its thickness is preferably at least 0.7 mm and even at least 1 mm.

The shape of the core of the microparticles is preferably chosen from a sphere, a spheroid, or even a cylindrical or oblong shape.

D3 generally corresponds to the diameter of the core (of substantially spherical shape).

Also preferably, the average dimension of the core, referred to as $D_{am}$, is in a range extending from 5 μm to 200 μm generally corresponding to the average diameter of the core (of substantially spherical shape).

The microparticles (and better still all the scattering particles) are spaced apart from one another and preferably at least do not form clusters of microparticles; more preferably still they are individual.

D' is chosen to be smaller than $2D_3$ (and therefore smaller than 400 μm and preferably smaller than 200 μm) because this makes it possible to choose a low degree of coverage of microparticles in a transparent matrix while easily preserving transparency.

Preferably, the average dimension of the particle called $D'_m$ (generally corresponding to the average diameter of the particle (of substantially spherical shape) is smaller than $2D_3$ and even than $2D_{3m}$.

It is also preferable for the thickness of the shell called $E_4$ (mineral shell in particular) to be at least 100 nm and better still at least 500 nm for a better mechanical strength, in particular for hollow microparticles.

Preferably, the scattering layer is:
- devoid of individual particles having a largest dimension (and even preferably an average dimension) of at least 400 μm (and even of at least 200 μm) or at least in a sufficiently small number to not increase haze significantly;
- and/or devoid of particle aggregates having a largest dimension of at least 400 μm (and even of at least 200 μm) or at least in a sufficiently small number to not increase haze significantly.

In one preferred embodiment, said largest dimension $D_3$ (and even the average dimension of the core) is in the range extending from 20 μm to 100 μm and better still the smallest dimension called 13 of the core is such that $I_3>D_3/10$ or better still even $b>D_3/5$.

In one preferred embodiment, the degree of coverage of the microparticles, which are preferably hollow (preferably forming at least 80% or at least 90% or 95% of the scattering particles and even all the scattering particles), is at most 20% and preferably at most 10% and better still at least 1%.

Practically, to measure the degree of coverage, visual observations are carried out with an optical microscope from above the scattering layer, and the total area occupied by the microparticles (sum of the areas occupied by each of the microparticles) is determined—the microparticles are visible from above because the matrix is transparent—this calculation being valid whether the microparticles are in a single layer or distributed through the volume of the scattering layer (at various heights). An area rather than a volume occupied by the microparticles is determined for the sake of simplicity.

To determine the total area occupied by the microparticles, preferably a reference area of 1 cm² (in the plane of the glazing pane) is chosen. A plurality of optical microscope images may be necessary to form this reference area, taken in any region of the scattering zone. The evaluation may be repeated in a plurality of regions distributed over the scattering zone, for a calculation even more representative of the degree of coverage.

Preferably, to guarantee the uniformity of the optical properties of the scattering layer, the degree of coverage of preferably hollow microparticles is at most 20% and preferably at most 10% and better still at least 1%, said degree being measured in a reference area taken in any region and better still measured in a plurality of regions in order to cover at least 50% of the area of the scattering zone.

The lower n3, the more the degree of coverage may be lowered for a given level of luminous performance.

In one preferred embodiment, the microparticles (preferably forming at least 80% or at least 90% of the scattering particles and even all the scattering particles) are hollow in order to create the largest possible refractive index difference (n3−n2) with the matrix. Furthermore, these are preferably mineral hollow microparticles (most and even at least 80% or even at least 90% or even all the microparticles), in particular made of metal oxide or better still of mineral glass or of silica. Preferably, most and even at least 80% or even at least 90% or at least 95% of the microparticles or even all the microparticles are hollow, mineral and better still made of mineral glass or of silica.

Hollow microspheres the shell of which is made of glass are commercially available, manufactured in large amounts and at low cost, and are used at the present time to lighten cement-based construction materials.

The shell is preferably devoid of open porosity, in particular in order to keep air in the core. The external surface of the shell may either be smooth or rough.

Preferably, the dielectric material of the shell is of refractive index n4 such that n4>n3 and such that, in absolute value, n4−n2 is at most 0.2 at 550 nm (better still in all the visible spectrum) and even at most 0.1 at 550 nm (and better still in all the visible spectrum).

In one preferred embodiment, in particular in order to obtain a better resistance to possible heat treatments, the shell of the microparticles is made of a mineral material, preferably mineral glass, or silica, in particular sol-gel silica, or even a metal oxide such as aluminum, zirconium or titanium oxide. Likewise, the core may even also be solid and mineral, for example a core made of porous (sol-gel) silica and a shell made of (sol-gel) dense silica.

Preferably, most of the microparticles (or even at least 80% or at least 90% of the microparticles, and preferably all the scattering particles) are individual, rather than being formed by aggregates of particles. For the sake of simplicity, the (preferably monoparticle) microparticles may preferably be monodisperse in size and of identical material. It is therefore enough to control the dispersion of the (mono) particles during the formation of the scattering layer.

The thickness of the scattering layer may be at least 20 µm, at least 0.2 mm and even (at least) millimeter-scale in size. The thickness of the scattering layer may be larger than the largest dimension of the microparticles.

The microparticles (at least most or even at least 90% of the microparticles, preferably all the scattering particles) may:

be dispersed in the matrix (or therefore with a shell entirely surrounded by the matrix), the microparticles in particular being incorporated in the matrix before application as a layer;

or with one or more points of contact with the first or second face of the first glazing pane, the particles being bound by the matrix;

or on (transparent) adhesive spots on the first or second face of the first glazing pane, the particles being bound by the matrix;

or on adhesive spots on the face of a lamination interlayer, the particles being bound by the matrix.

The microparticles (at least most or even at least 90% of the microparticles, preferably all the scattering particles) may protrude from the matrix, into the air (in particular for a glazing module with a single glazing pane) with or without one or more points of contact with the first face of the first glazing pane.

The transparent matrix, which is in particular deposited by wet processing, may be made of a material chosen from a polymeric binder such as a paint and in particular a lacquer or a resin.

In particular, the scattering layer may include a layer binding the microparticles made of a material chosen from an organic binder, in particular one based on acrylate, silicone, epoxy, silicone-epoxy or polyurethane, or a mineral binder such as an in particular sol-gel silica and/or a metal oxide, such as an oxide of silicon or silicon and titanium, a titanium oxide, a zirconium oxide or an oxide of titanium and zirconium. And/or the scattering layer may include a preferably clear or colorless polyvinyl butyral (PVB) layer binding the microparticles, which is a thermoplastic lamination interlayer material that is preferred in automotive applications to ethylene vinyl acetate (EVA) or even polyurethane (PU).

The transparent matrix may be defined by an (intrinsic) light transmission of at least 50%, better still of at least 80%, and even of at least 90%, which is deducible from the light transmission of the first glazing pane and transparent matrix (without microparticles) together and the light transmission of the first glazing pane alone.

The preferably hollow microparticles may be in a transparent polymeric film for example polyethylene terephthalate (PET), polycarbonate (PC), or polymethyl methacrylate (PMMA), said film preferably being submillimeter-sized or millimeter-sized or better still at most 1 mm in thickness. This transparent polymeric film may be added by adhesive bonding with an optical adhesive to the first glazing pane (in particular glazing module with only one single glazing pane).

The matrix may be a layer of one given material or a multilayer; for example, the first layer is an organic binder such as a resin (deposited by wet processing) of thickness smaller than the microparticles, and the second layer, covering the microparticles, is a thermoplastic lamination interlayer (in particular PVB, for example acoustic PVB), the glazing module then being a laminated glazing unit using a second glazing pane.

The, preferably hollow, microparticles may be bound by a matrix that is a preferably PVB thermoplastic lamination interlayer, said interlayer preferably being submillimeter-sized or millimeter-sized or better still at most 1 mm in thickness. When the (preferably PVB, for example acoustic PVB) lamination interlayer is of refractive index of lower than n1 it is preferable for the microparticles to make contact with the first glazing pane so that as many rays as possible reach the microparticles.

When the module is a monolithic glazing unit, the light is guided solely in the first glazing pane by total internal reflection at the first and second faces corresponding to the face A and face B, respectively.

The lamination interlayer may furthermore be tinted, above all if it does not form all or some of the transparent matrix. The (PVB) lamination interlayer may be clear and in a tinted zone, such as a peripheral band (tinted PVB band). For a windshield, it is for example a question of a band along the upper longitudinal edge. It is preferable for the light to be optically coupled to an edge face distinct from that of the edge with the tinted band. For example, the tinted zone is absent from the zone of the glazing module between the optical coupling edge face and the scattering layer. For example, for a windshield, the lower longitudinal edge and better still the driver-side edge is chosen.

When the glazing module is a laminated glazing unit with a second glazing pane and/or a tinted lamination interlayer, guidance of light in the first glazing pane by total internal reflection at the first and second faces is favored.

In this case, if it is desired for the largest number possible of rays to propagate in the first glazing pane:
  the light source (diodes) is facing the first edge face of the first glazing pane, preferably with the emitting face of the light-emitting diodes centered on the first edge face;
  the scattering layer is directly on the first or second face of the first glazing pane; and
  preferably the refractive index nf of the lamination interlayer is smaller than n1 by at least 0.01 at 550 nm, as for PVB, above all if distinct from the transparent matrix (therefore on the scattering layer).

Alternatively or cumulatively, when the glazing module is a laminated glazing unit with a tinted lamination interlayer and/or a second tinted glazing pane and/or even with an absorbing or scattering element, a layer (forming an optical isolator), such as a layer of porous (sol-gel) silica, of refractive index of at most 1.3 and even of at most 1.2 at 550 nm (better still in all of the visible) may be on the second face (lamination side) opposite the first face. The scattering layer is on the first or side of the second face, this layer forming an optical isolator being adjacent the scattering zone if the scattering layer is on the second face.

Preferably, the scattering layer is in the interior of the laminated glazing unit, in particular on the (lamination) second face of the first glazing pane and not on the first face or face A because it is then protected from the exterior environment (abrasion, dirt) and the glazing module preserves the perfectly smooth appearance of a glazing unit without a scattering layer.

In position mounted in the automotive vehicle, in the case of a laminated roof, face A is the face on the side of the interior of the automotive vehicle, which face is conventionally denoted face F4 (and the scattering layer is preferably on the second face opposite face A). In the case of a roof made up of a single glazing unit, face A is the face on the side of the interior of the automotive vehicle, which face is conventionally denoted face F2 (and the scattering layer is preferably on face A).

It is possible to add other functions to the luminous glazing unit with a glazing module that is a laminated glazing unit, in particular a roof, as for example an electrocontrollable device:
  a function enabling passage from clear to dark: a suspended particle device (SPD) with the scattering layer on the first or second face and the active layer (between two electrodes) between two (PVB) lamination interlayers;
  a tint function: an electrochromic device.

In position mounted in the automotive vehicle, in the case of a laminated windshield, face A is the face on the interior side of the automotive vehicle, which face is conventionally denoted face F4 (and the scattering layer is preferably on the second face opposite face A, i.e. therefore on face F3).

In position mounted in an automotive vehicle that is an automobile, in the case of a laminated rear windshield, face A is the face on the side of the exterior of the automobile conventionally denoted face F1 and the scattering layer is preferably on the second face (lamination face and therefore F3) opposite face A (face A possibly with a windscreen wiper).

In position mounted in the automotive vehicle, in the case of a laminated side window, face A is preferably the face on the side of the exterior of the automotive vehicle, which face is conventionally denoted face F1, and the scattering layer is preferably on the second face (lamination face) opposite face A, i.e. therefore on face F2.

In position mounted in the automotive vehicle, in the case of a single side window or a single rear windshield, face A is the face on the side of the exterior of the automotive vehicle, which face is conventionally denoted face F1, and the scattering layer is preferably on the second face opposite face A (face A possibly with a windscreen wiper for the rear windshield).

In the present application, the expression "automotive vehicle" is understood to mean an automobile, in particular a commercial vehicle (small truck, van or wagon) lighter than 3.5 tonnes (light commercial vehicle) or even a truck. The side windows may be in sliding doors. The glazing module may be in a rear door.

It is desirable for the scattering layer to be as invisible as possible and as discreet as possible. Human visual perception is able to clearly distinguish two different effects: scattering at small angles and over a wide angular field.

The light is scattered uniformly in all directions. This causes an attenuation of contrast and an image of cloudy and dulled appearance. Standard ASTMD 1003 defines veiling or haze as being the amount of light that deviates on average by more than 2.5° relative to the incident light beam—expressed in percent.

The light is scattered in a narrow angle with high concentration. This effect describes very well how very fine details may be seen through the sample. The quality of the image clarity must be determined in an angle smaller than 2.5 degrees.

The haze and image clarity are preferably measured by a hazemeter (such as the BYK-Gardner Haze-Gard Plus) preferably according to standard ASTDM D1003 (without compensation) or indeed ISO 13468 (with compensation) applied both for a first glazing pane made of organic glass (in particular PC) and for one made of mineral glass.

It is preferable to take the measurements before the possible lamination. For example, the illuminant is placed facing opposite the face of the first glazing pane bearing the scattering layer.

Preferably, the scattering layer is directly on the first or second face of the first glazing pane and:

the haze, called $H_1$, in the off state, of the first glazing pane and scattering layer together is at most 10% and better still at most 5% and even at most 2%; and better still the image clarity, in the off state, of the first glazing pane and scattering layer together is at least 90% and better still at least 95%.

Current scattering enamel solutions have a haze of more than 80%.

It is possible to consider the haze, called $H'_1$, in the off state of the first glazing pane together with a layer made of the transparent matrix without the microparticles to be at most 1%.

A first glazing pane made of mineral glass, in particular clear and even extra-clear mineral glass, is preferably chosen.

An (in particular clear) lamination interlayer that is the least hazy possible, i.e. one with a haze of at most 1.5% and even at most 1%, is also preferably chosen.

It is preferable to take the measurements before a possible lamination. For example, the illuminant is placed facing opposite the face of the first glazing pane bearing the scattering layer.

It is desirable for the scattering layer to be as invisible as possible and discreet as possible, nevertheless the second glazing pane and/or the lamination interlayer may be tinted.

Preferably, there is no notable color difference between the first glazing pane and the scattering layer together and the first glazing pane without the scattering layer, in particular:

the difference between L1 and L2 is at most 20 and even at most 10;

and even:

the difference between a1* and a2* is at most 10 and even at most 5;

the difference between b1* and b2* is at most 10 and even at most 5.

Furthermore, the luminance is preferably at least 1 cd/m² and even at least 10 cd/m².

In another specific configuration, the scattering layer is not directly on the second face but associated via the lamination interlayer. The light source is optically coupled to the first glazing pane (via the first edge face), the lamination interlayer is clear or colorless and of refractive index of such that in absolute value n1−nf is at most 0.15 and better still at most 0.05, and the second glazing pane is tinted and includes on its lamination face the scattering layer. In this case, it is possible also to define the haze, called $H_1$, in the off state, of the tinted second glazing pane and scattering layer together, as at most 10% and better still at most 5% and even at most 2% and better still the image clarity, in the off state, of the tinted second glazing pane and scattering layer together is also at least 90% and better still at least 95%.

For a luminous (signaling) function on the vehicle exterior, the glazing module, for example a side window (front or rear quarter window, etc.) or a rear windshield, may be a monolithic glazing unit, with said first glazing pane, the second face of which, which corresponds to the interior face (called face F2), is coated with the scattering layer. It is possible to add to the interior side of the glazing module a tinted layer of refractive index lower than n1, for example a plastic film. It is possible to use optical adhesive between the plastic film and the first glazing pane. If a tinted film of refractive index higher than n1 is chosen, it is preferable to insert in between either a low-index layer such as a layer of porous sol-gel silica or a low-index adhesive.

In one preferred embodiment, the light source (preferably diodes on a PCB carrier) is optically coupled to the first glazing pane (better still to the first edge face), the scattering layer is preferably on the first face or on the second face and the glazing module is a laminated glazing unit including said first glazing pane made of (clear or extra-clear) mineral glass, in particular of thickness of at most 2.1 mm, a lamination interlayer made of a preferably thermoplastic polymeric material (better still of PVB) and a second glazing pane made of mineral glass, in particular of thickness of at most 2.1 mm, and is in particular chosen from:

a roof (for a vehicle-interior luminous function) with the first glazing pane innermost, face A is the face called face F4, the scattering layer is preferably between the second face (called face F3) and the lamination interlayer, the second glazing pane and/or the lamination interlayer preferably being tinted;

a windshield (for a vehicle-interior luminous function for example for signaling to the driver, by way of anti-collision means), face A is the face called face F4, and the scattering layer is preferably between the second face (called face F3) and the lamination interlayer; and a side window or rear-door window or a rear windshield (for a vehicle-exterior luminous function, in particular a signaling function) with the first glazing pane outermost, face A is the face called F1, and the scattering layer is preferably between the second face (called face F2) and the lamination interlayer.

In one preferred embodiment, the light source (preferably diodes on a PCB carrier) is optically coupled to the first glazing pane (better still to its first edge face), the scattering layer is preferably on the first face or on the second face and the glazing module is a laminated glazing unit including said first glazing pane made of (clear or extra-clear) mineral glass, in particular of thickness of at most 2.1 mm, a lamination interlayer made of a preferably thermoplastic polymeric material (better still of PVB) and a second glazing pane made of mineral glass, in particular of thickness of at most 2.1 mm, the lamination interlayer and/or the second glazing pane preferably being tinted, and an optical isolator of refractive index lower than n1 is preferably on the second face between the first glazing pane and the lamination interlayer, in particular a porous silica (sol-gel) layer of refractive index of at most 1.3 and even of at most 1.2 and better still of thickness of at least 200 nm, even of at least 400 nm and preferably of at most 1 μm. This porous silica sol-gel layer is described in patent application WO2008/059170 in particular in FIG. 11. And the scattering layer is on the first face or on the second face adjacent to the porous silica layer.

The porous silica layer may be on either side of the scattering layer, which is on the side of the lamination, or even just in the upstream zone between the coupling edge and the closest edge of the scattering layer.

In one preferred embodiment, the light source, preferably diodes on a PCB carrier, is optically coupled to the first glazing pane, a laminated glazing unit including said first glazing pane made of (preferably clear or extra-clear) mineral glass in particular of thickness of at most 2.1 mm, a lamination interlayer made of a preferably clear, preferably thermoplastic polymeric material (better still of PVB) and a second glazing pane made of (preferably tinted) mineral glass in particular of thickness of at most 2.1 mm, and the microparticles are bound by the polymeric material of the lamination interlayer forming all or some of the transparent matrix. Mineral shells and even hollow microparticles, such as hollow silica or glass beads, are preferably chosen.

In particular, the luminous glazing unit forms a windshield, a roof or a side window (front or rear quarter windows included).

Preferably, in these laminated embodiments:
the lamination interlayer is preferably an in particular clear or tinted (in particular acoustic) PVB; and
the first and second glazing panes are curved, the first glazing pane is clear or extra-clear and the second glazing pane is tinted.

Alternatively, the light source, preferably diodes on a PCB carrier, is optically coupled to the first glazing pane, the scattering layer is on the first face or on the second face, and the glazing module is a monolithic glazing unit, the first glazing pane made of mineral glass preferably being thermally tempered and/or curved.

The light source, in particular LEDs, may be between the edge face of the glazing module (of the first glazing pane), preferably a laminated glazing unit, and a peripheral polymeric encapsulation as described in patent application WO2010049638 in particular in FIG. 15 or in FIG. 16. The encapsulation may be made of polyurethane, in particular of PU-RIM (reaction in mold), the two-component PU being cured in the mold, after the two components have been injected simultaneously. This material is typically injected up to 130° C. and at a few tens of bars.

Other encapsulation materials are:
preferably flexible thermoplastics: thermoplastic elastomer (TPE), polyvinyl chloride (PVC), ethylene-propylene-diene terpolymer (EPDM), typically injected between 160° C. and 240° C. and up to 100 bars;
stiff thermoplastics: polycarbonate (PC), polymethyl methacrylate (PMMA), polyethylene (PE), polypropylene (PP), polyamide (PA66), acrylonitrile butadiene styrene (ABS), ABSPC, typically injected between 280° C. and 340° C. and between 500 and 600 bars.

The encapsulation extends along the edge face of the glazing module and from at least one edge of the first main face (preferably face F4 for a laminated glazing unit). The encapsulation may be any shape, with or without a lip, bi-face, tri-face.

In one embodiment with a laminated glazing unit, a (bi-face and therefore flush) peripheral polymeric encapsulation such as mentioned above and a light source including diodes on a PCB carrier, the (rectangular or square) first glazing pane comprises a void (along the first edge face and preferably of smaller length than the first edge face, in order to house the diodes, and opening onto the first and second main faces (longitudinal groove if the coupling edge face is a longitudinal edge face, lateral groove if the coupling edge face is a lateral edge face), and the PCB carrier, preferably a rectangular strip, is against and preferably adhesively bonded to the periphery of the internal lamination face of the second glazing pane (this zone of the internal face optionally being coated with an opaque additional layer, such as an enamel) and the diodes are side-emitting diodes.

The PCB carrier may help with suppressing stray light (i.e. light visible from the exterior) in the second when the optional encapsulation is flush with the face of the second glazing pane (face F1) which is opposite the lamination face.

The laminated glazing unit may alternatively or cumulatively comprise an element for masking the light source (diodes) and possible stray light (in particular on face F1, for example the face B, opposite the innermost face F4, for example the face A, in proximity to the injection zone), and/or for masking the attachment of the glazing unit to the body of the vehicle via the external face, the masking element possibly being:
a portion of the (black, sufficiently opaque) polymeric encapsulation which is then tri-face;
and/or a sufficiently opaque enamel, on the periphery of the lamination face of the second glazing pane (face F2) and/or on the outermost face (face F1);
and/or a reflective surface (layer, etc.) on the periphery of the lamination face (face F2) of the second glazing pane.

Among solutions for masking stray light, mention may be made of those described in patent application WO2014/037643 in which the lamination interlayer is coated with an opaque layer.

In one embodiment, the second glazing pane projects beyond the first glazing pane, at least in those portions of the edge of the glazing unit in which the light source (the diodes preferably) is housed, so as to create, on the lamination-side main face of the second glazing pane or on a coating covering this face, a zone for receiving a bead of adhesive, which is peripheral relative to the light source and wide enough and therefore able to receive a bead of adhesive intended to fasten the luminous glazing unit to the body of the vehicle. Optionally, an encapsulating element, having the shape of a thin coating, which covers the edge face of the second glazing pane and the free zone for receiving the bead of adhesive, extends as far as the lamination interlayer. Embodiments are described in FIGS. 1, 2 and 3 of patent application WO2013153303.

When the light source is formed of diodes, on a PCB carrier, the PCB carrier may make thermally conductive contact with an element for dissipating heat itself making contact with the air and even with a polymeric encapsulation. Embodiments are described in FIGS. 1, 2, 3 and 4 of patent application WO2013109330.

The invention also relates to an automotive vehicle incorporating the luminous glazing unit defined above.

Preferably, the scattering zone is in the glazed area, in particular when the glazing unit includes a peripheral polymeric encapsulation or a frame, for example made of PU, covering the periphery of faces A and/or B and is spaced apart by a least 2 cm from the edge face of the glazing module (of the first glazing pane) coupled to the light source.

The scattering zone preferably covers less than 50% of the area of the first glazing pane when it is necessary to preserve a glazed area in the on state. The glazing module may comprise an identical second light source, in particular comprising light-emitting diodes, on its periphery and opposite the first source. In particular, for a square or rectangular glazing unit (and more broadly for a glazing unit with corners) the first source may be on a first longitudinal (lateral, respectively) edge face and the second source may be on a second longitudinal (lateral, respectively) edge face.

The glazing module may comprise a plurality of scattering zones of identical or distinct sizes and/or shapes. The extracting means may therefore cover some or all of one or more faces depending on the illumination or effect sought (in the form of bands placed on the periphery of one of the faces to form a luminous frame, logos or patterns, etc.).

The extracting means may be made up of a number of segments, for example identical or distinct, continuous or discontinuous patterns, and may be of any geometric shape (rectangular, square, triangular, circular, oval-shaped, etc.), and may form a drawing or a symbol (arrow, letter, etc.). It is easily possible to obtain industrially reproducible and controllable delimitation of the zones. The glazing unit may thus comprise a plurality of extracting zones (scattering layers) in order to form a plurality of luminous zones on the glazing unit.

Additional extracting means may if needs be provided, for example one face of the first glazing pane may also be frosted, sandblasted, screen-printed, etc., or the thickness of the glass may also be etched, etc.

The illumination/extraction may be adjusted to provide ambient lighting, light for reading, a luminous signal, illumination at night or to display information of any nature, such as a drawing, logo, alphanumeric symbol or other symbols, and may also be activated by remote control (detection of the vehicle in a parking lot or elsewhere, indicator of (un)locking of the doors), safety warning sign, etc. The light may be continuous and/or intermittent, monochromatic and/or polychromatic, white, etc.

The first glazing pane (and the second glazing pane in the case of a laminated glazing unit) may preferably be curved (by bending processes known to those skilled in the art). It is a question of monolithic glass panes, i.e. panes composed of a single sheet of mineral glass, which may be produced by the float process, allowing a perfectly flat and smooth sheet to be obtained, or by drawing or rolling processes.

By way of examples of glazing materials, mention may be made of float glass, optionally chemically or thermally hardened or tempered, having a conventional soda-lime composition, an aluminum borosilicate, sodium borosilicate or any other composition.

The first glazing pane (and the second glazing pane in the case of a laminated glazing unit) is preferably curved or bent. It may be parallelepipedal, with sheets or main faces that are rectangular, square or even any other shape (round, oval, polygonal). It may be various sizes, and in particular large in size, for example of area larger than 0.5 or 1 m$^2$.

Mineral glass has multiple advantages, in particular a good resistance to heat (it may thus be close to the light sources, for example diodes, despite the fact that they constitute hot spots; it also meets the requirements of fire-safety standards) and a good mechanical strength (it is thus easy to clean and scratch resistant).

The first glazing pane may (depending on the esthetic rendering, the desired optical effect, the destination of the glazing unit, etc.) be a clear glass (light transmission $T_L$ higher than or equal to 90% for a thickness of 4 mm), for example a glass of standard soda-lime composition such as Planilux® from Saint-Gobain Glass, or an extra-clear glass ($T_L$ higher than or equal to 91.5% for a thickness of 4 mm), for example a soda-lime-silica glass with less than 0.05% Fe III or $Fe_2O_3$ such as the glass Diamant® from Saint-Gobain Glass, or the glass Optiwhite® from Pilkington or the glass B270® from Schott, or a glass of another composition described in document WO04/025334.

The glass of the first glazing pane may be neutral (colorless), or (slightly) tinted or colored (glass VENUS or TSA from Saint-Gobain Glass, etc.); have undergone a thermal or chemical treatment such as a toughening, annealing or tempering treatment (in particular to obtain a better mechanical strength) or a bending treatment and is generally obtained by the float process.

The first glazing pane—and even the glazing module—may have this or these properties "intrinsically", i.e. bare, without the presence of any coating, or be a transparent substrate that is coated on at least one surface (other than its edge face) with a coating made up of one or more layers and having this or these properties integrated over the equivalent of the entirety of its area. The light transmission is measured according to standard ISO 9050:2003 (also mentioning optical transmission) using illuminant D65, and is the total transmission (in particular integrated over the domain of the visible and weighted by the curve of sensitivity of the human eye), taking into account both direct transmission and possible diffuse transmission, the measurement for example being carried out using a spectrophotometer equipped with an integrating sphere, the measurement at a given thickness then being converted if needs be to the reference thickness of 4 mm according to standard ISO 9050:2003.

Of course, the luminous glazing unit is not completely opaque (or reflective) so an object may be seen behind it. The luminous glazing unit (the glazing module in particular) may have a non-zero light transmission TL in all or some of the glazed area (generally framed by enamel or another masking layer), and better still at least 40% or at least 50% or 70% of the glazed area. For an (often tinted) roof, a light transmission TL that is non-zero and even at least 0.5% or at least 2% and at most 10% and even at most 8% is preferred. For a rear side window (independently of whether the glazing module is laminated or not; the term "side window" including a quarter or vent window) or a rear windshield (the glazing module preferably being laminated), a light transmission TL that is non-zero and even at least 10% or at least 20% and in particular at most 80% or at most 70% (in particular a rear side window or a tinted rear windshield) is preferred. For an (in particular tinted) front side window (independently of whether the glazing module is laminated or not) a light transmission TL that is non-zero and even at least 50% or at least 70% is preferred. For a windshield (the glazing module preferably being laminated) a light transmission TL that is non-zero and even at least 70% is preferred. These values of TL may be in a zone with the scattering layer and/or adjacent to the scattering layer (and in the glazed area).

The first glazing pane is preferably curved and even thermally tempered. The first glazing pane may have been given a heat treatment at a temperature of 450° C. or more, preferably of 600° C. or more, and is in particular even a pane of tempered curved glass.

The thickness of the first glazing pane is preferably comprised between 0.7 and 2.1 mm. The thickness of the second glazing pane is preferably comprised between 0.7 and 2.1 mm. It may be preferable for the thicknesses of the two glass panes to be equal.

The first glazing pane could be essentially plastic (organic sheet(s) for example made of polycarbonate or PC), to increase compactness and/or lightness, or to allow more diverse shapes to be obtained (it generally comprises at least one mineral glass sheet as indicated above). In particular, this may be a side window or a roof (for a preferably monolithic glazing module).

In the case of a laminated glazing unit, the second glazing pane may preferably be tinted and advantageously has an overall light transmission ranging from 1.0% to 60.0% (in particular from 10.0% to 50.0% and in particular from 20.0% to 40.0%). It may furthermore have an optical transmission (determined as is known by calculating the ratio of the transmitted intensity to the incident intensity at a given wavelength) of at least 0.5% for at least one wavelength, comprised in the domain of the visible, above 420 nm (and up to 780 nm), and preferably of at least 0.5% for all the wavelengths comprised in the domain extending from 420 to 780 nm.

In the case of a laminate, the glazing module comprises at least one lamination interlayer such as at least one transparent plastic film or sheet (preferably made of PVB or (flexible) PU or a thermoplastic without plasticizer (ethylene/ vinyl acetate copolymer (EVA), etc.), each film for example having a thickness between 0.2 mm and 1.1 mm, in particular between 0.38 and 0.76 mm. The interlayer may be acoustic and in particular comprise or consist of an acoustic PVB (a trilayer, quadlayer, etc.). Thus, the lamination interlayer may comprise at least one what is called middle layer made of a viscoelastic plastic having vibro-acoustic damping properties and in particular based on polyvinyl butyral and plasticizer, and the interlayer furthermore comprising two external layers made of standard PVB, the middle layer being between the two external layers. Mention may be made of the acoustic PVBs described in the patent applications WO2012/025685, WO2013/175101, in particular tinted as in WO2015079159.

The second glazing pane may also be made of a (preferably rigid or semi-rigid) organic glass such as polymethyl methacrylate (PMMA)—preferably with a (PU) lamination interlayer—or polycarbonate (PC)—preferably with a PVB lamination interlayer.

In the case of a laminate, it is in particular possible to choose as first glazing pane/lamination interlayer/second glazing pane:
- mineral glass/(acoustic, etc.) PVB/mineral glass;
- or even mineral glass/lamination interlayer/polycarbonate;
- or even (thick or not) polycarbonate/lamination interlayer/mineral glass.

Alternatively to a laminated structure involving a typically thermoplastic lamination interlayer (sheet), the glazing module (the luminous glazing unit) may comprise only the single or monolithic first glazing pane (for example a sheet) to which a functional self-adhesive (tinted plastic, decorative, etc.) film or sticker is optionally added on the second face of the first glazing pane.

Each optically coupled edge face may be worked, in particular straight and polished.

As defined according to the invention, the luminous glazing unit according to the invention also comprises at least one light source coupled to the guide in order to propagate light (by total internal reflection) inside the guide (in its thickness), which source is advantageously associated with or coupled to the edge face of the guide (in another embodiment, it could optionally be associated with or coupled to one of the main faces (and in particular be housed in a cavity or a groove)).

It is possible to use one or more (optionally identical) light sources, for example electrical sources and/or sources consisting of (a) light-emitting device(s) (LEDs, etc.). The one or more light sources may be monochromatic (emitting in the blue, green, red, etc.) or polychromatic, or be designed or combined to produce for example white light, etc.; they may be continuous or discontinuous, etc.

The edge face, the corner or the edge of one face of the glazing module (of the first glazing pane) may include a void in which the light sources are placed (it is for example possible to cut (before tempering) the edge of a sheet of a single or laminated glazing unit in order to house diodes therein) and/or the latter may be adhesively bonded, in particular to the edge face (an adhesive with an optical refractive index intermediate between the index of the guide and that of the external medium or of the lens for example is then chosen). The voided zone may form a groove along the glazing module (the first glazing pane) for housing a plurality of sources, said groove not opening or opening onto at least one side in order to facilitate mounting from this side. The sources may be in a protecting means and/or a means for holding them inside the voided zone, in particular a U-shaped profile fastened to the coupling edge face by adhesive bonding, snap fitting, by bolts, etc., and may occupy some or most of the voided zone.

Advantageously (in particular for environmental reasons, reasons of size, of heating, etc.) quasi-point light sources (such as diodes) are used, these sources advantageously being placed along the edge face of the glazing module, this embodiment being simple, economic and effective.

The diodes may be single semiconductor chips (without encapsulation or a collimating lens) that are for example about one hundred μm or one or a few millimeters in size (for example 1 mm in width, 2.8 mm in length and 1.5 mm in height). They may also comprise an optionally temporary protective package in order to protect the chip during handling or to improve compatibility between the materials of the chip and other materials and/or be encapsulated (for example in a low-volume surface mounted device (SMD) encapsulation) in a package, for example made of epoxy resin or nylon or PMMA, encapsulating the chip and having various functions: protection from oxidation and moisture; collimating or focusing/scattering role; wavelength conversion, etc.).

The total number of diodes is defined by the size and location of the zones to be illuminated, by the desired light intensity and by the uniformity required for the light.

The power of each diode is generally lower than 1 W and in particular lower than 0.5 W.

The diodes may be (pre-)assembled on one or more PCB (printed circuit board) carriers or carriers with electrical supply tracks, these PCB carriers possibly being fastened to other carriers (profiles, etc.). Each PCB carrier may border the glazing module and be fastened by pinching, wedging, clip fastening, screwing, adhesive or double-sided adhesive tape, etc. The PCB carrier is generally thin, and in particular smaller than or equal to 3 mm, or even 1 mm or even 0.1 mm in thickness or smaller in thickness than the thickness of a lamination interlayer if relevant. A plurality of PCB carriers may be provided, in particular if the zones to be illuminated are very far apart. The PCB carrier may be made of a flexible dielectric or electrical conductor (metal such as aluminum, etc.), be a composite, a plastic, etc. The diodes may be soldered to tracks electrically insulated from the base, and/or to thermal pads on plastic bases, or an electrically insulating and thermally conductive material (adhesive, tape, adhesive tape, double-sided adhesive, thermal conductor, thermal grease, etc.) may fasten or be inserted therebetween for a better dissipation and luminous efficacy and for the longevity of the diodes.

The diodes may comprise or even preferably be single semiconductor chips, for example of width W0 of about one hundred μm or 1 to 5 mm. The width of each diode of the light source is preferably smaller than the thickness of the first glazing pane.

The diodes may optionally comprise a (temporary or permanent) protective package for protecting the chip during handling or to improve the compatibility between the materials of the chip and other materials.

Each diode of the light source may in particular be chosen from at least one of the following light-emitting diodes:
- a side-emitting diode, i.e. emitting parallel to (the faces of) the electrical contacts i.e. with a lateral emitting face relative to the PCB carrier; and
- a diode the main emission direction of which is perpendicular or oblique to the emitting face of the chip.

The diodes preferably have a Gaussian (type) spectrum.

The emission pattern of a diode is conventionally Lambertian with an emission half angle of 60°.

Preferably, the distance between the chips (or the collimating means if present) and the first coupling edge face (the second coupling edge face, respectively) is smaller than or equal to 5 mm and even to 2 mm.

Other types of sources than diodes may optionally be used, if relevant in an ad hoc void, or on an added element. These other light sources may be directly on one of the (for example main) faces of the substrate, or be adhesively bonded to or laminated with another in particular transparent substrate (glass, etc.) using an in particular extra-clear lamination interlayer.

Whatever the light source, the thickness of the source is advantageously small, possibly as little as a few nanometers or tens of nanometers in particular.

In one advantageous embodiment, one or more sensors monitoring the environment and/or the glazing unit may be associated with the light sources and/or with the power supply system of said glazing unit. It is for example possible to use a luminosity detector (photodiode, etc.), a temperature sensor (exterior sensor or sensor integrated into the glass or the light sources), the sensor used for example controlling the power supply of the light sources via a processor or central unit. It is possible to define a sensor measurement value (maximum luminosity for example) beyond which the glazing unit ceases to operate one of its functions (light extraction or activation of the light sources in particular). For a higher value for example, the supply of the glazing unit is turned off and for a lower value, the glazing unit or one of its functions (for example its luminosity level) may be controlled via information received from the one or more sensors. The function of the glazing unit may also be "forced" by the user by deactivation of the sensors.

The sensors may be in the interior (for example of the vehicle) or on the exterior. Managing the glazing unit depending on the exterior environment makes it possible for example to improve the durability of the light sources and other components (polymers, electronic components, etc.) as limiting their operation under high luminosity and/or temperature conditions in particular makes it possible to significantly decrease (by between 10 and 20° C. at least) the maximum temperatures to which the light sources may be exposed during use of the product, while nonetheless preserving the functions of the luminous glazing unit. This coupling also makes it possible to automatically adapt the illumination brightness of the glazing unit to exterior luminosity conditions, without the user having to intervene.

For an automotive glazing unit, the supply of power to the light sources may for example be controlled by the central processor of the vehicle, permitting them to be turned on or not depending on the information received from the light sensor placed for example in the top portion of the windshield or on a glazing unit such as an illuminating roof. Under high luminosity (day), the luminosity value exceeds the maximum value, causing the light sources to remain off; under conditions of low luminosity (night), the maximum value is not reached, and the sources are then activated. Turn on of the sources may also be controlled by a temperature sensor (on the glazing unit or on the light sources, etc.).

FIG. 1 shows a schematic cross-sectional and partial view of a luminous automotive-vehicle glazing unit 100 in a first embodiment of the invention.

In FIG. 1, the glazing unit according to the invention includes a glazing module taking the form of a laminated glazing unit with an edge face and external main faces denoted face A and face B, which includes:

- a for example rectangular first glazing pane 1 (dimensions of 300×300 mm for example) made of mineral glass having a first main face 11 corresponding to the face A and a second main face 12, and a preferably rounded (to prevent flakes) here longitudinal (or as a variant lateral) edge face 10, for example a sheet of extra-clear, soda-lime-silica glass such as Diamant glass sold by Saint-Gobain Glass, of thickness equal for example to 2.1 mm, said glazing pane having a refractive index n1 of about 1.51 at 550 nm;
- a lamination interlayer 2, for example a clear PVB of 0.76 mm thickness, preferably of haze of at most 1.5%, with a here longitudinal edge face 20 shifted from the longitudinal edge face 10 toward the center of the glass, said lamination interlayer having a refractive index nf, lower than n1, equal to 1.48 at 550 nm; and
- a second glazing pane 5 of the same dimensions, with a composition for a tinted solar-control function (VENUS VG10 or TSA 4+ glass sold by Saint-Gobain Glass) for example of thickness for example equal to 2.1 mm and/or covered with a solar-control coating (or a tinted plastic film), with what is called an internal or lamination main face 12' facing the second face 12, and another main face 11' corresponding to the face B and an edge face 10' that here is longitudinal.

The first glazing pane 1 includes a void or through-hole along the longitudinal edge face 10, preferably of smaller dimension than the longitudinal edge face.

Light-emitting diodes 4 border the first glazing pane 1. It is here a question of side-emitting diodes housed in the void. Thus, these diodes 4 are aligned on a PCB carrier 41, for example a parallelepiped-shaped strip, which is preferably as opaque (not transparent) as possible and their emitting faces are parallel to the PCB carrier and facing the edge face 10 in the voided edge-face portion. The PCB carrier is for example fastened by adhesive 8 (or a double-sided adhesive) to the edge of the lamination face of the second glazing pane, and here is engaged in a groove between the lamination face 12 and the second face 12', which is made possible by the edge face 20 of the PVB being sufficiently set back. A peripheral masking band 7 made of opaque enamel, which may mask the PCB carrier and even light exiting in this zone, is added to the face 12'.

The light-emitting diodes each include an emitting chip able to emit one or more rays in the visible, which one or more rays are guided in the first glazing pane. The diodes are small in size, typically a few millimeters or less and in particular about 2×2×1 mm in size, without optics (lens) and preferably not pre-encapsulated in order to decrease bulk as much as possible.

The distance between the diodes and the edge face 10 is made as small as possible and is for example 1 to 2 mm. The main emission direction is perpendicular to the face of the semiconductor chip that for example has a multi-quantum well active layer in an AlInGaP or other semiconductor technology. The light cone is a Lambertian cone of +/−60°. By way of example, the diodes (a dozen) have an individual power of 50 mW to 100 mW, over a length of 20 mm, namely a power of 3 to 4 W/m. The space between each chip and the optically coupled edge face 10 may be protected from any pollution: water, chemical, etc., both over the long term and during manufacture of the luminous glazing unit 100.

In particular, it is useful to provide the luminous glazing unit with a polymeric encapsulation 9 that is about 2.5 mm thick, bordering the glazing unit. This encapsulation provides a long-term seal (water, cleaning products, etc.). The encapsulation also provides a good esthetic finish and allows other elements or functions (reinforcing inserts, etc.) to be incorporated.

The encapsulation 9 is bi-face: facing the edge face of the laminated glazing unit (making contact with the edge face 10' with or without adhesion primer) and partially on the edge of face A, and has a lip. The encapsulation 9 is for example made of polyurethane black and in particular made of PU-RIM (reaction in mold). This material is typically injected at up to 130° C. and at a few tens of bars.

The black encapsulating material is therefore not transparent to the visible radiation of the diodes. To ensure a good injection of light into the first glazing pane, means providing a seal to the liquid encapsulating material are therefore used. For example, the diodes are covered by the optical adhesive 6 or by a protective varnish.

As described in document WO2011092419 or document WO2013017790, the polymeric encapsulation may have a through-void closed by a removable cap in order to allow the diodes to be placed or replaced.

The glazing unit may have a plurality of luminous zones, the one or more luminous zones preferably occupying less than 50% of the area of at least one face, in particular of given geometry (rectangular, square, round, etc.).

The light ray A (after refraction at the edge face 10) propagates by total internal reflection (at the second face 12 and from the face 11 called face A) in the first glazing pane 1 forming a light guide. For the light extraction, a scattering layer 5 is deposited on the second face 12 of the first glazing pane. It includes a preferably colorless transparent matrix 50 of refractive index n2 at least equal to n1 or such that n1−n2 is at most 0.15, incorporating scattering particles 51.

Figure 1A:
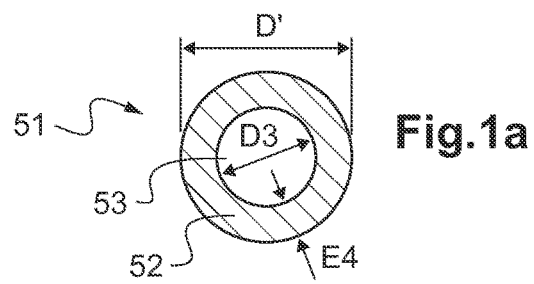
FIG. 1a is a view of a hollow microparticle used for light extraction.
Figure 1:
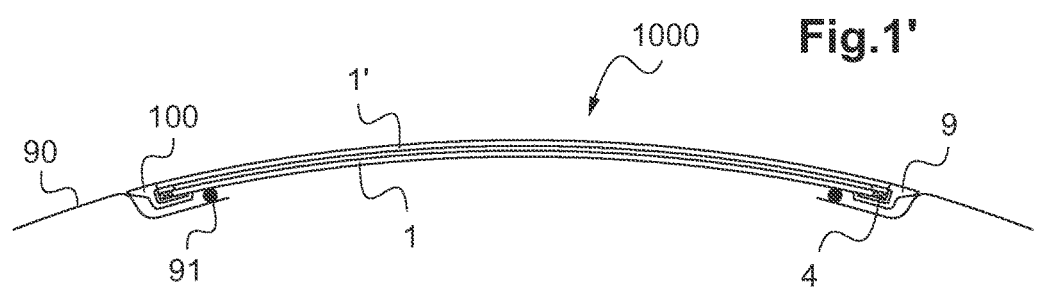

Microparticles that are preferably hollow, formed from a dielectric shell 52 surrounding a gaseous core of refractive index n3 of at most 1.15, preferably air, are chosen, as shown in FIG. 1a.

The diameter $D_3$ (diameter of the core) is in a range extending from 5 μm to 200 μm and better still ranging from 20 μm to 100 μm. The diameter D' of the microparticles (outside diameter of the shell) is smaller than 2 $D_3$. The thickness of the shell is more than 500 nm.

The degree of coverage of the microparticles is preferably 1% to 10%. It is determined by observation by optical microscope.

The scattering zone is rectangular and 10 cm by 10 cm in size. The scattering zone is a continuous, unapertured layer.

By way of illustration, the microparticles are hollow glass microbeads of average diameter D' of 65 μm (product denoted Glass Bubbles K1 sold by 3M) and the shell of which is of submicron-sized thickness E4 of a few hundred nm, and are placed in a colorless resin based on silicone-epoxy denoted SILIKOPON sold by TEGO EVONIK. The resin filled with hollow microbeads is spread over the second face 12 using a motorized bar coater in order to obtain a thickness of 120 μm on the second face 12.

For example, the illuminant is placed on the side opposite to the scattering layer in order to take measurements of haze and image clarity, before the lamination.

In a first example, the concentration of the microspheres is chosen in order to achieve a degree of coverage of 1%. The haze $H_1$ of the first glazing pane with the scattering layer is 1.5% and, in a zone without the scattering layer, lower than 1%. The image clarity of the first glazing pane with the scattering layer is 99% and, in a zone without the scattering layer, is almost 100%. The luminance is higher than 1 cd/m².

In a second example, the concentration of the microspheres is chosen in order to achieve a degree of coverage of 5%. The haze $H_1$ of the first glazing pane with the scattering layer is 5% and, in a zone without the scattering layer, again lower than 1%. The image clarity of the first glazing pane with the scattering layer is 97% and, in a zone without the scattering layer, is again almost 100%. The luminance is about 10 cd/m².

When the diodes are turned off, the first glazing pane coated with the scattering layer is of light transmission $T_L$ of about 88%.

The scattering layer may be deposited before or after bending (tempering), preferably after it is a question of a resin transparent matrix.

Alternatively, the scattering layer 5 is on face A.

The ray A refracted in the scattering layer 5 encounters a scattering hollow microsphere allowing light to be extracted in particular toward face A.

The small number of hollow microspheres combined with the choice of a transparent matrix allows the haze H1 of the first glazing pane coated with the scattering layer to be limited.

It is possible to choose diodes emitting colored or white light in order to provide ambient lighting, light for reading, etc. Red light may be chosen for signaling purposes optionally in alternation with green light.

To mask the stray light visible face-B side, an opaque enamel is used on the border of the lamination face 12' of the second glazing pane 1'.

The luminous glazing unit in FIG. 1 may for example form a static luminous panoramic automotive-vehicle (such as an automobile) roof, mounted from the exterior on the body 90 via an adhesive 91 as shown in FIG. 1'. The first glazing pane 1 is on the interior side of the vehicle.

When the diodes are turned on, the extraction may form a luminous drawing, for example a logo or a trademark.

In one alternative embodiment (not illustrated) of a laminated glazing unit, differing in the absence of the resin from that described in FIG. 1, the microparticles (hollow glass microbeads) are bound by the PVB lamination interlayer. For example, the microparticles are spread over the second face (lamination face) of the first glazing pane then the PVB sheet is affixed before the lamination cycle is carried out. As a precautionary measure, the beads may even be pre-fastened via spots of optical adhesive on the second face, before the lamination.

Alternatively, the microparticles are spread over the main face of the lamination interlayer intended to make contact with the first glazing pane then the first glazing pane is affixed before the lamination cycle is carried out. As a precautionary measure, the beads may even be pre-fastened via spots of optical adhesive to this face of the interlayer, before the lamination.

The laminated glazing unit in FIG. 1 may alternatively form a front quarter window (possibly with the encapsulation removed). The scattering layer forms a side repeater. It is on the clear or extra-clear first glazing pane which here is the outermost, on face F1 or preferably on face F2 lamination-face side. Optionally, an opaque masking layer is on the—optionally tinted—internal glazing pane, for example on face F3. Side repeaters may also be formed on the rear quarter window.

This laminated glazing unit may alternatively form a front windshield (possibly with the encapsulation removed or adapted). The scattering layer forms an anti-collision signal for the driver and is on the innermost clear or extra-clear first glazing pane on face F4 or on face F3, in particular forming a band along the lower longitudinal edge. For example, the (red) light turns on when a vehicle in front is too close. The second glazing pane is also a clear or extra-clear glass pane.

In FIG. 2, the luminous automobile glazing unit differs from that described in FIG. 1 in that it is a question of a monolithic glazing unit and indeed one without polymeric encapsulation. Furthermore, the diodes are top-emitting diodes. The PCB carrier 41 is for example fastened to the edge face 10 by the optical adhesive 6.

This luminous glazing unit for example forms a roof for example made of clear mineral glass or of polycarbonate.

This luminous glazing unit may even form a side window made of clear mineral glass or of polycarbonate, for signaling:

for example detection of the vehicle (in a parking lot, etc.);

side repeater preferably in a quarter window (front drive-side quarter window or rear quarter window).

FIG. 3 shows an automobile with the luminous glazing unit according to the invention, which here is a rear windshield with a luminous zone for a signaling purpose. The scattering layer 5 with the microparticles forms a third stoplight (scattering band 5 centered along the upper longitudinal edge), the (masked) diodes emitting in the red.

If a monolithic glazing unit is chosen, it is preferable for the scattering layer to be on the second face called face F2 of the first glazing pane 1, in particular if the first face 11 called face F1 (face A) is equipped with windscreen wipers. A tinted plastic film may be added on the inside.

If a laminated glazing unit is chosen, it is preferable for the scattering layer to be on the outermost lamination face called F2 of the first glazing pane 1 (clear glass such as Planilux, or Planiclear or extra-clear glass such as Diamant or Optiwite), in particular if face A (first face 11) called face F1 is equipped with windscreen wipers.

FIG. 4 shows an automobile with the luminous glazing unit, which here is a rear windshield with a luminous zone for an exterior signaling purpose. The scattering layer 5 with the microparticles forms indicators or side repeaters (two arrows of opposite direction directed toward the exterior of the glazing unit and in proximity to its lateral edges). It may be preferable to place the diodes (here masked) on each lateral edge.

If a monolithic glazing unit is chosen, it is preferable for the scattering layer to be on the second face called face F2 of the first glazing pane 1, in particular if the first face 11 called face F1 (face A) is equipped with windscreen wipers. A tinted plastic film may be added on the inside.

If a laminated glazing unit is chosen, it is preferable for the scattering layer to be on the outermost lamination face called F2 of the first glazing pane 1 (clear glass such as Planilux, or Planiclear or extra-clear glass such as Diamant or Optiwite), in particular if face A (first face 11) called face F1 is equipped with windscreen wipers.

FIG. 5 shows an automobile with the luminous glazing unit, which here is a rear windshield with a luminous zone for an exterior signaling purpose. The scattering layer 5 may form a luminous hazard-warning signal, in red, in the well-known form of a luminous triangle with a central exclamation mark.

If a monolithic glazing unit is chosen, it is preferable for the scattering layer to be on the second face called face F2 of the first glazing pane 1, in particular if the first face 11 called face F1 (face A) is equipped with windscreen wipers. A tinted plastic film may be added on the inside.

If a laminated glazing unit is chosen, it is preferable for the scattering layer to be on the outermost lamination face called F2 of the first glazing pane 1 (clear glass such as Planilux, or Planiclear or extra-clear glass such as Diamant or Optiwite), in particular if face A (first face 11) called face F1 is equipped with windscreen wipers.

The invention claimed is:

1. A luminous automotive-vehicle glazing unit comprising:

a glazing module with an edge face and two external main faces, said glazing module including at least one first glazing pane, made of organic or mineral glass, of refractive index n1 of at least 1.4 with first and second main faces;

a light source optically coupled to the glazing module, the glazing module forming a guide of light emitted by the light source; and a light-extracting system configured to extract the guided light in order to form a scattering zone of width of at least 1 cm, said light-extracting system including a scattering layer comprising scattering dielectric particles bound by a matrix, said scattering layer being associated with one of the first or second main faces;

wherein the matrix is transparent and of refractive index n2 at least equal to n1 or such that n1−n2 is at most 0.15, and wherein the scattering particles are mainly microparticles that are spaced apart from one another and that comprise a shell made of a transparent dielectric material and making contact with the transparent matrix, said shell surrounding a core of refractive index n3 of at most 1.15, said core having a largest dimension $D_3$ in a range extending from 5 µm to 200 µm, the microparticles having a largest dimension D' smaller than $2D_3$.

2. The luminous automotive-vehicle glazing unit as claimed in claim 1, wherein a degree of coverage of the microparticles is at most 20%.

3. The luminous automotive-vehicle glazing unit as claimed in claim 2, wherein the degree of coverage of the microparticles is at most 1%.

4. The luminous automotive-vehicle glazing unit as claimed in claim 1, wherein the microparticles are hollow.

5. The luminous automotive-vehicle glazing unit as claimed in claim 4, wherein the dielectric material of the shell is mineral glass, silica or a metal oxide.

6. The luminous automotive-vehicle glazing unit as claimed in claim 1, wherein the dielectric material of the shell is mineral glass, silica or a metal oxide.

7. The luminous automotive-vehicle glazing unit as claimed in claim 1, wherein said largest dimension $D_3$ is in the range extending from 20 µm to 100 µm.

8. The luminous automotive-vehicle glazing unit as claimed in claim 1, wherein the scattering layer includes a layer binding the microparticles made of a material chosen from an organic binder, or a mineral binder and/or the scattering layer includes a PVB layer binding the microparticles.

9. The luminous automotive-vehicle glazing unit as claimed in claim 8, wherein the organic binder is based on acrylate, silicone, epoxy, silicone-epoxy or polyurethane, and the mineral binder is a metal oxide and/or silica.

10. The luminous automotive-vehicle glazing unit as claimed in claim 1, wherein the scattering layer is directly on the first main face or the second main face of the first glazing pane, and, defining the haze $H_1$, in the off state, of the first glazing pane and scattering layer together, H1 is at most 10%.

11. The luminous automotive-vehicle glazing unit as claimed in claim 10, wherein H1 is at most 2%.

12. The luminous automotive-vehicle glazing unit as claimed in claim 1, wherein the scattering layer is directly on the first main face or the second main face of the first glazing pane, and, the image clearness, in the off state, of the first glazing pane and the scattering layer together, is at least 90%.

13. The luminous automotive-vehicle glazing unit as claimed in claim 1, wherein the light source includes a set of light-emitting diodes.

14. The luminous automotive-vehicle glazing unit as claimed in claim 13, wherein the lamination interlayer is a clear or tinted PVB.

15. The luminous automotive-vehicle glazing unit as claimed in claim 13, wherein the first and second glazing panes are curved, the first glazing pane is clear or extra-clear and the lamination interlayer and/or the second glazing pane is tinted.

16. The luminous automotive-vehicle glazing unit as claimed in claim 1, wherein the light source is optically coupled to the first glazing pane, the scattering layer is on the first main face or on the second main face, the glazing module is a laminated glazing unit including said first glazing pane made of mineral glass, and including on a side of the second main face a lamination interlayer made of a thermoplastic polymeric material and a second glazing pane made of mineral glass, said luminous glazing unit being chosen from:
   a roof, with the first glazing pane innermost, the scattering layer is between the second face and the lamination interlayer;
   a windshield, with the first glazing pane innermost, the scattering layer is between the second face and the lamination interlayer; and
   a side window or rear-door window or a rear windshield, with the first glazing pane outermost, the scattering layer is between the second face and the lamination interlayer.

17. The luminous automotive-vehicle glazing unit as claimed in claim 1, wherein the light source is optically coupled to the first glazing pane, the glazing module is a laminated glazing unit including said first glazing pane made of mineral glass and, on a side of the second main face, a lamination interlayer made of a thermoplastic polymeric material and a second glazing pane made of mineral glass, and wherein a layer of porous silica sol-gel of refractive index of at most 1.3 is on the second main face of the first glazing pane and the scattering layer is on the first main face or on the second main face adjacent to the porous silica layer.

18. The luminous automotive-vehicle glazing unit as claimed in claim 1, wherein the light source is optically coupled to the first glazing pane, the glazing module is a laminated glazing unit including said first glazing pane made of mineral glass, a lamination interlayer made of thermoplastic polymeric material and a second glazing pane made of mineral glass, and wherein the microparticles are bound by the polymeric material forming all or some of the transparent matrix.

19. The luminous automotive-vehicle glazing unit as claimed in claim 1, wherein the light source is optically coupled to the first glazing pane, the scattering layer is on the first main face or on the second main face, and the glazing module is a monolithic glazing unit.

20. The luminous automotive-vehicle glazing unit as claimed in claim 19, wherein the first glazing pane made of mineral glass is thermally tempered and/or curved.

21. An automotive vehicle incorporating a luminous glazing unit as claimed in claim 1.

22. The automotive vehicle incorporating a luminous glazing unit as claimed in claim 21, wherein the luminous glazing unit an automobile roof.

* * * * *